UNITED STATES PATENT OFFICE.

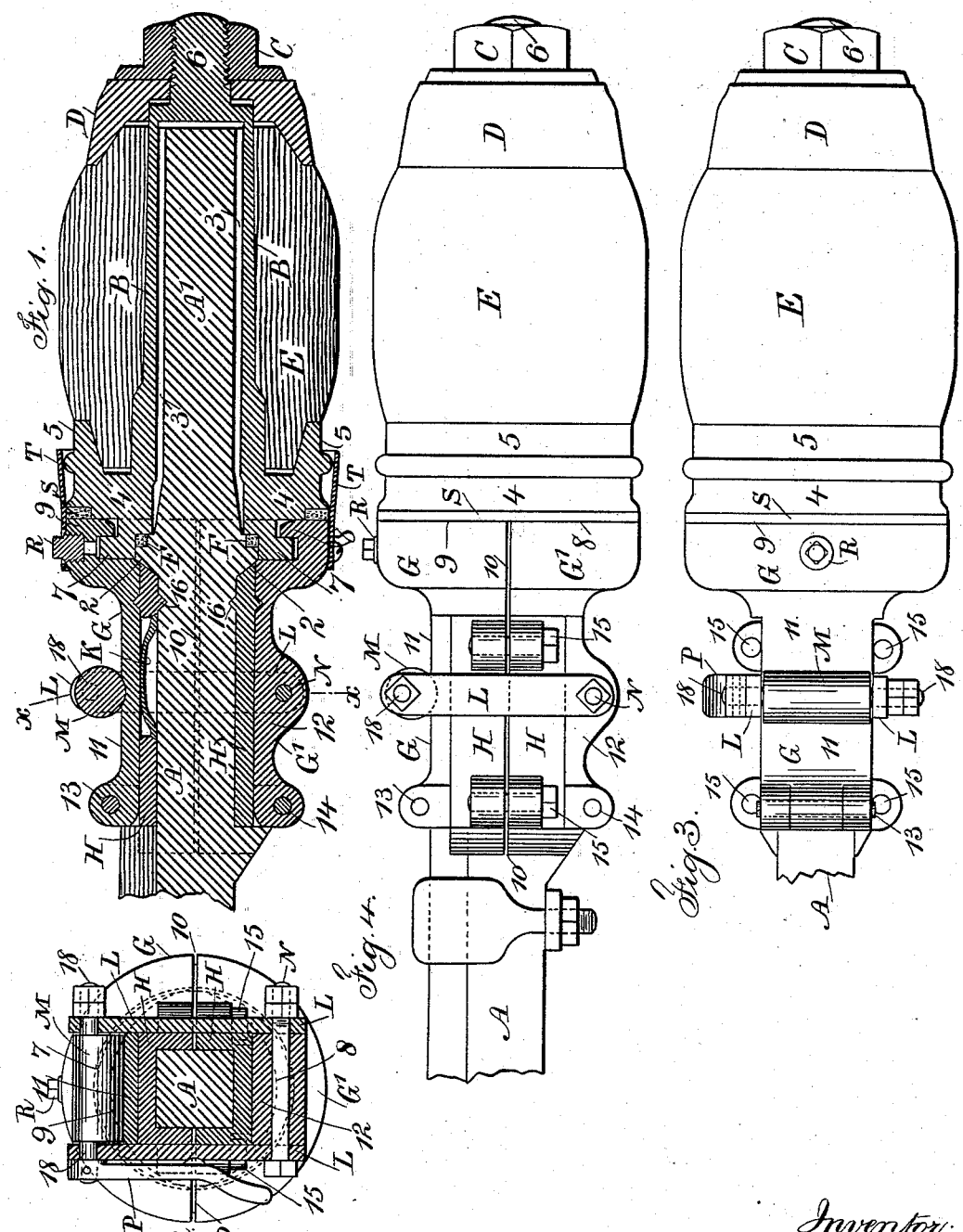

FRANCIS C. W. RORER, OF PHILADELPHIA, PENNSYLVANIA.

AXLE-BOX FOR WHEELS.

SPECIFICATION forming part of Letters Patent No. 524,791, dated August 21, 1894.

Application filed December 23, 1893. Serial No. 494,511. (No model.)

*To all whom it may concern:*

Be it known that I, FRANCIS C. W. RORER, a citizen of the United States, residing at West Philadelphia, in the county of Philadelphia and State of Pennsylvania, have invented an Improvement in Axle-Boxes for Wheels, of which the following is a specification.

Axle boxes have heretofore been provided with collars at the inner ends held by clip pieces by the opening of which the wheel can be removed from the axle.

The object of the present invention is to provide for the easy removal of the wheel and the proper retention of the lubricating material.

In the drawings, Figure 1 is a longitudinal section of the hub and part of the axle. Fig. 2 is a cross section at the line $x$ $x$ of Fig. 1. Fig. 3 is a plan view. Fig. 4 is an elevation of the clip for holding the axle box upon the axle.

The axle A is of ordinary character and usually the same is square up to the place where the round collar 2 is provided, and the cylindrical end A' of the axle is adapted to receive the box B of the hub, and it is advantageous to provide upon the cylindrical portion A' grooves at 3 that allow the lubricating material to extend along upon the axle and prevent friction.

At the back end of the box B is a circular flange 4 having an annular flange 5, the interior surface of which is conical, and the hub is bored out so as to receive the box B and also turned off to fit tightly against the conical interior surface of the annular flange 5, and the outer end of the box B is closed and provided with a screw 6 receiving the nut C that is screwed on and acts to clamp the annular collar D to the wooden hub E, and the interior surface of the annular collar D is conical so that by the action of the conical surfaces of D and of 5 the wood of the hub E will be reliably confined and clamped and held around the box B so that there will be no risk of the hub splitting and becoming disconnected from the axle box, and the entire wheel hub is strengthened, and the only duty of the nut C is to hold the annular collar D firmly upon the end of the hub and clamp the parts as aforesaid, because this nut C does not hold the hub or the axle box to the axle, but at the back end of the axle box and projecting from the flange 4 is an annular flange 7 to which the clamp is applied that holds the hub to the axle, as hereinafter described.

I prefer to introduce a washer F of leather or other suitable material into the recess between the collar 2 and the back end of the axle box B, which washer F serves to retain in the axle box any lubricating material which may be introduced thereinto before the axle box is placed upon the axle.

The annular flange 7 is grasped by the lips 8 and 9 of the clips G and G', which clips are separated longitudinally at the line 10, preferably upon the horizontal plane passing through the center of the cylindrical axle A', and the end portions of the clips G and G' are semicircular for the reception of the annular flange 7, but such clips extend along above and below the axle A in the form of straps 11 and 12 that are pivoted at 13, 14 upon ears that extend above and below the divided clamp H which is in the form of a box separable upon the line 10 with ears at the sides receiving the vertical bolts 15 that pass through the ears and by which the divided clamp is firmly fastened to the axle B and it cannot slide forward even if it should become loose on account of the annular flange 2; and it is advantageous to provide ribs or teats 16 entering recesses in the axle A to prevent the divided clamp H sliding backwardly upon the axle A.

The lips 8 and 9 are adapted to fit into the annular groove between the flange 7 and the back portion 4 of the axle box, and the inner edges of the lips 8 and 9 are nearly half circles described by a radius corresponding to the radius of the exterior surface of the annular collar 7, so that when the clips G and G' are opened sufficiently for the edges of the lips 8 and 9 to be as far apart as the diameter of the annular collar 7, the hub and the box B can be drawn off the axle or replaced thereupon, after which the clips G and G' are to be closed toward each other to hold the hub in its position on the axle.

It is advantageous to introduce a suitable spring K in a recess in the upper part of the divided clamp H, the same being adapted to raise the clip G sufficiently to clear the lip 9 from the flange 7, and the clip G' is to be allowed to drop by gravity for the same purpose, and in bringing these clips G and G' toward each other and in closing and retaining the flange 7, any suitable mechanism may be made use of, but I prefer the straps L at opposite sides of the divided clamp H, which straps L are connected by a bolt N passing through the straps and through the lower clip G', and the eccentric M is provided with a shaft 18 projecting at the ends of the eccentric through the straps L, and such eccentric M rests upon the clip G; and there is a lever P by which the eccentric M is rotated, and the eccentric M is constructed so that when partially rotated it allows the clip G to rise by the action of the spring K and the clip G' to drop by gravity to open the lips 8 and 9, as aforesaid; and when this eccentric M is rotated in the other direction the clip G is forced down into position and the clip G' raised so as to hold the axle box by the action of the lips 8 and 9; and it is advantageous to apply the handle or lever P in such a position upon the eccentric M that it will hang down when the clips G and G' are closed for the lips 8 and 9 to hold the axle box in place.

To lubricate this axle box it is advantageous to introduce oil or similar material into the closed tube B and then to place the same upon the axle A', the washer F serving to retain the lubricating material, and a hole is provided in the clip G above the annular flange 7 so that lubricating material can be introduced between the flange and the clip, and a movable cap R is provided for this hole so as to retain the lubricating material. It is also advantageous to turn off an annular recess around the portion 4 of the axle box and to introduce into the same a washer S of leather or other suitable material which serves to exclude dust and to retain the lubricating material upon the lips 8 and 9.

In axle boxes adapted to country use, sand and earthy materials are liable to fall into the box at the rear end, and to exclude this I employ the guard T fitting upon and adapted to the respective clips G and G', and semi-cylindrical or nearly so in shape, so as to inclose and protect the back end of the axle box and hub from earth, sand or other materials that may fall off from the wheel.

I claim as my invention—

1. The combination with the axle and tubular axle box having an annular flange 7 at the back end, of clips having lips that engage the annular flange and straps extending along at opposite sides of the axle, a divided clamp surrounding the axle, pivotal connections between the straps of the clips and the divided clamp, and means for holding the clips in position when their lips engage the annular flange, substantially as set forth.

2. The combination with the axle and tubular box having an annular flange at its back end, of clips having lips that engage the annular flange and straps extending above and below the axle, pivotal connections at the back ends of the straps, an eccentric adjacent to the strap of one of the clips, links extending from the eccentric and connected with the other clip, and means for turning the eccentric to bring the clips into action or to release them from the annular flange of the axle box, substantially as set forth.

3. The combination with the axle and tubular box having an annular flange at its back end, of clips having lips that engage the annular flange and straps extending above and below the axle, pivotal connections at the back ends of the straps, an eccentric adjacent to the strap of one of the clips, links extending from the eccentric and connected with the other clip, means for turning the eccentric to bring the clips into action or to release them from the annular flange of the axle box, and a spring for raising the upper clip when released from the eccentric, substantially as set forth.

4. The combination with the axle and tubular axle box having an annular flange at the back end, of clips having lips that engage the annular flange, pivotal connections for the clips and means for holding the same in position when the lips engage the annular flange, and the washers F and S introduced in the respective annular recesses, substantially as set forth.

Signed by me this 21st day of December, 1893.

FRANCIS C. W. RORER.

Witnesses:
ANNA R. BOYD,
MARY L. COOK.